United States Patent [19]
Davis et al.

[11] Patent Number: 5,896,382
[45] Date of Patent: Apr. 20, 1999

[54] METHOD AND APPARATUS FOR COMMUNICATING INFORMATION BETWEEN A HEADEND AND SUBSCRIBER OVER A WIDE AREA NETWORK

[75] Inventors: Glenn A. Davis, Lilburn; Paul Michael Huddleston, Atlanta, both of Ga.

[73] Assignee: Scientific-Atlanta, Inc., Norcross, Ga.

[21] Appl. No.: 08/751,946

[22] Filed: Nov. 19, 1996

[51] Int. Cl.$^6$ .................................................. H04J 3/16
[52] U.S. Cl. ............................ 370/401; 370/347; 370/449
[58] Field of Search .................................. 370/401, 402, 370/405, 395, 389, 465, 466, 467, 474, 442, 473, 455, 443, 410, 310, 319, 321, 329, 337, 338, 341, 347, 346, 444, 447, 449, 458, 461, 462, 908, 901, 349, 350; 340/825.08

[56] References Cited

U.S. PATENT DOCUMENTS

| | | | |
|---|---|---|---|
| 4,835,463 | 5/1989 | Baran et al. | 324/123 |
| 4,939,451 | 7/1990 | Baran et al. | 324/127 |
| 4,939,726 | 7/1990 | Flammer et al. | 370/94.1 |
| 5,007,052 | 4/1991 | Flammer | 370/85.6 |
| 5,069,369 | 12/1991 | McGarvey | 222/321 |
| 5,079,768 | 1/1992 | Flammer | 370/94.1 |
| 5,115,433 | 5/1992 | Baran et al. | 370/94.3 |
| 5,130,987 | 7/1992 | Flammer | 370/103 |
| 5,223,790 | 6/1993 | Baran et al. | 324/127 |
| 5,243,536 | 9/1993 | Bradford | 364/483 |
| 5,338,332 | 8/1994 | Baran et al. | 75/247 |
| 5,462,225 | 10/1995 | Massara et al. | 236/47 |
| 5,463,624 | 10/1995 | Hogg et al. | 370/461 |
| 5,481,542 | 1/1996 | Logston et al. | 370/461 |
| 5,559,870 | 9/1996 | Patton et al. | 379/107 |
| 5,594,732 | 1/1997 | Bell et al. | 370/410 |

FOREIGN PATENT DOCUMENTS

WO94/21076  9/1994  WIPO .

*Primary Examiner*—Dang Ton
*Attorney, Agent, or Firm*—Kenneth M. Massaroni; Hubert J. Barnhardt III; Kelly A. Gardner

[57] ABSTRACT

A distribution system architecture provides a platform for communicating energy services and non-traditional services as part of an overall communications infrastructure. A native message, regardless of the source of the message's application, is divided into data packets that are encapsulated and transmitted through an open network from a headend to a gateway or from the gateway to the headend. The receiver of the encapsulated data reassembles the original native message from the encapsulated data packets. The encapsulating information can include a header which incorporates a time division multiple access transport scheme. The encapsulating information at the headend provisions the gateways from the headend in a real time fashion and the headend dynamically allocates the gateway functions of listening, talking and acknowledging. A third of the time slots are allocated for polling each of the gateways during a predetermined period, a second third of the time slots are allocated to asynchronous, unsolicited communications from the gateways, and the final third of the slots are reserved for either polled or asynchronous communications. The reserved slots are dynamically allocated by the headend based on system and gateway needs.

6 Claims, 4 Drawing Sheets

FIG - 2 GATEWAY CONFIGURATION
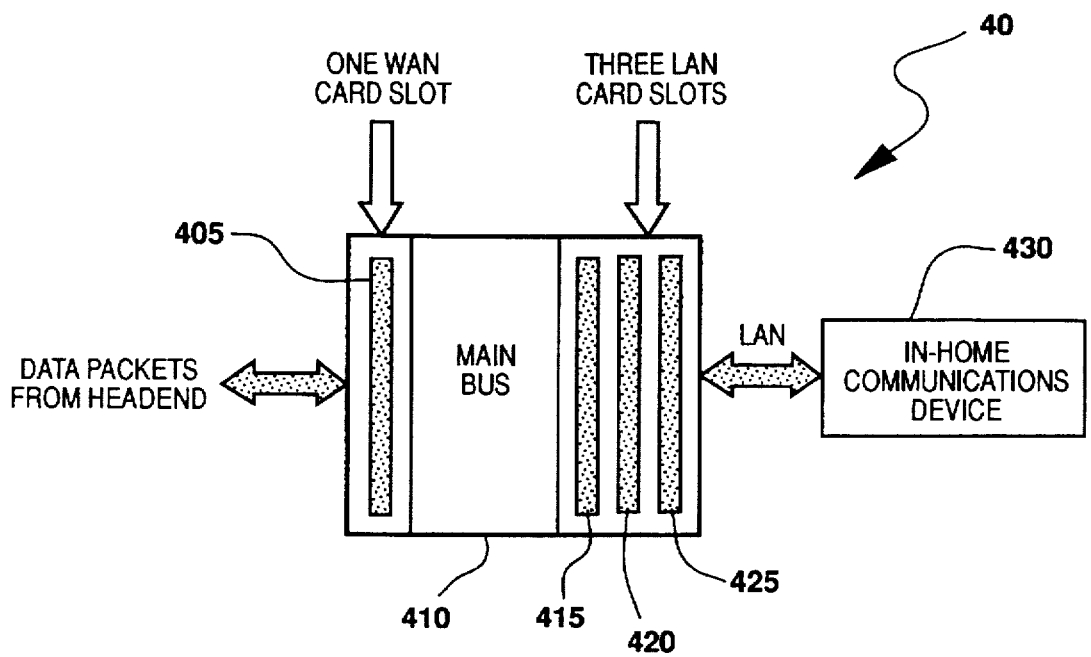
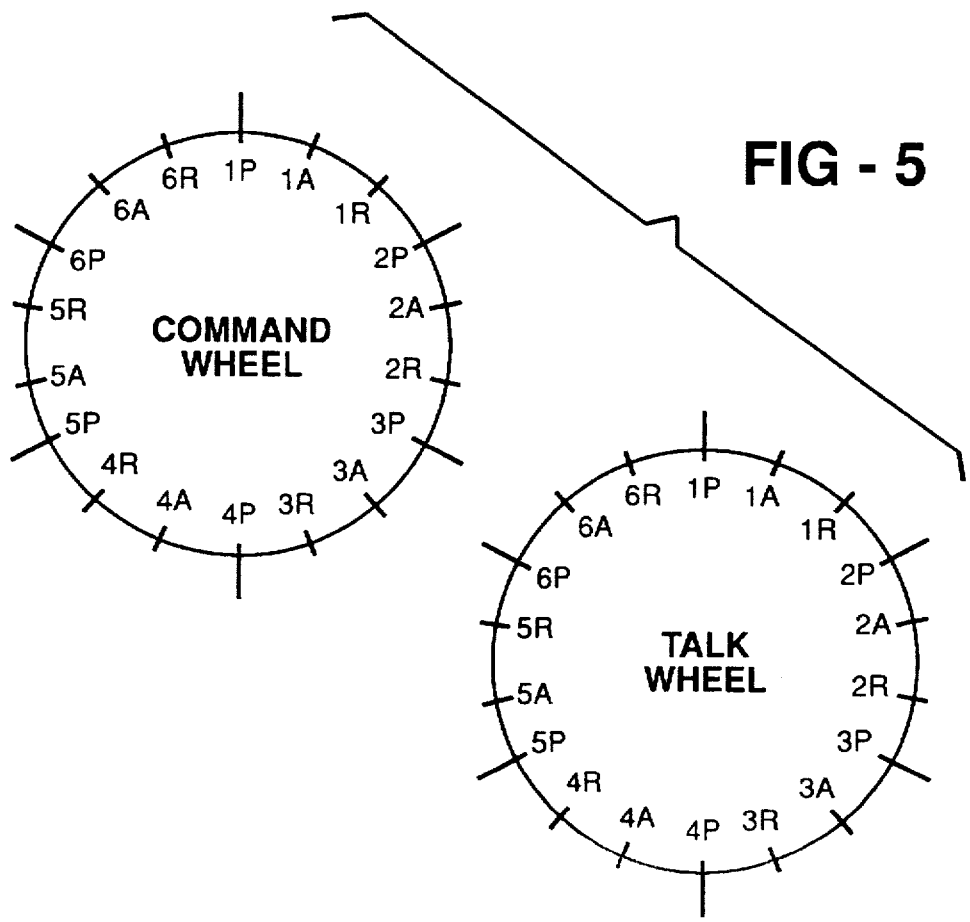
FIG - 5

| BYTE | CONTENTS |
|---|---|
| 1 | talkAddrFactory |
| 2 | " |
| 3 | " |
| 4 | " |
| 5 | talkAddr |
| 6 | " |
| 7 | ackAdr |
| 8 | " |
| 9 | listenAddr |
| 10 | " |
| 11 | frameNum |
| 12 | holdOff |
| 13 | Gateway Control: b7= sysDegraded; b3-0= aloha range |
| 14 | na |
| 15 | na |
| 16 | na |
| 17 | na |
| 18 | na |
| 19 | msgType |
| 20 | seqNum |
| 21 | ackNum |
| 22 | PID (protocol interface ID - specific interface type expected in gateway) |
| 23 | GPPD (Gateway peripheral processor data) |
| 24 | len |
| 25 | PTID (protocol translator ID or return address) |
| 26 | " |
| 27 | " |
| 28 | " |
| 29 | sessionId |
| 30 | sessionId |
| 31 | Native data packet (64 bytes) |
| 32 | " |
| ⋮ | ⋮ |
| 93 | " |
| 94 | " |
| 95 | CRC1 |
| 96 | CRC2 (last byte of message) |

FIG - 3

| BYTE | CONTENTS |
|---|---|
| 1 | talkAddrFactory |
| 2 | " |
| 3 | " |
| 4 | " |
| 5 | talkAddr |
| 6 | " |
| 7 | frameNum |
| 8 | gateway Data1: b7= reqToSend; b3-b0= buffer available |
| 9 | na |
| 10 | na |
| 11 | msgType |
| 12 | seqNum |
| 13 | ackNum |
| 14 | PID (peripheral processor ID) |
| 15 | GPPD (Gateway peripheral processor data) |
| 16 | len (length of valid bytes in native data packet) |
| 17 | PTID (protocol translator ID or return address) |
| 18 | " |
| 19 | " |
| 20 | " |
| 21 | sessionId |
| 22 | sessionId |
| 23 | Native data packet (64 bytes) |
| 24 | " |
| 25 | " |
| ⋮ | ⋮ |
| 85 | " |
| 86 | " |
| 87 | CRC1 |
| 88 | CRC2 (last byte of message) |

FIG - 4

METHOD AND APPARATUS FOR COMMUNICATING INFORMATION BETWEEN A HEADEND AND SUBSCRIBER OVER A WIDE AREA NETWORK

FIELD OF INVENTION

The invention generally relates to a communications system for allowing the transport and conversion of multiple standard and proprietary protocols. More particularly, the present invention is directed to a scheme for communicating information such as utility applications from a headend over a wide area network (WAN) to a gateway coupled to subscribers.

BACKGROUND OF INVENTION

Utilities often have to cope with the problem of satisfying consumer demand for energy. Energy demands fluctuate widely between peak and off-peak periods. For example, energy demands peak during hot summer days when consumers require air conditioning. One of the ways utilities handle such situations is by employing load management systems. Information is communicated between subscribers and a headend to efficiently manage consumer energy demands.

Other energy services have been developed including utility-based applications such as water, gas, and electric meter readings. In these applications, the headend communicates with a meter at a subscriber's premises. Often subscribers want to know what their energy cost and usage are at a particular time, for example during a billing period. An existing utility application allows the subscriber to request this information from the utility. The utility first obtains the information from the meter at the subscriber's premises performs a calculation at the headend and transfers the desired information to the subscriber.

More and more applications have been developed including those which extend beyond conventional utility applications. For example, home security and monitoring and the ability to program appliances are applications which can be implemented. These applications are distributed by different companies which use different protocols for both implementation of their services and for compatibility with the devices located on the subscriber premises.

Existing systems for communicating utility applications are closed or proprietary systems which require a specific type of native message compatible with devices located on the subscriber premises. For example, the applications are distributed over a wide area network that is specifically designed to handle the protocol for a particular vendor's application and the device located at the subscriber's premises.

There is a need to provide a network distribution system in which applications having different protocols can be broadcast together over the same network.

Another problem exists in setting up a scheme for a two-way interactive network distribution system wherein information can be transmitted in an inexpensive, orderly and an efficient manner between the headend and downstream gateways. One of the ways to control data transmission between gateways and the headend is for the gateway to be programmed to receive and transmit at specific times using a TDMA (time division multiple access) scheme. Existing TDMA schemes provision the gateway to operate stand alone. Thus, the gateway must keep track of when to talk and when to listen. These functions require processing power and are expensive to implement. As a result, existing schemes require significant processing power at the gateway because intelligence must be incorporated to provision the gateway for stand alone operation. Thus, there is a need to reduce the amount of intelligence in the gateway to limit the overall system cost and processing power required by the gateway.

SUMMARY OF THE INVENTION

The present invention overcomes the aforementioned problems by providing a framework that allows different application providers to communicate with subscribers without a concern about the communications media for transporting the communications. The application provider can simply initiate commands and queries to the network, receive back data at a specified time, and present data to the user. According to the present invention, an open system is provided which permits the same subscriber to use applications having different protocols. Thus, one of the advantages of the present invention is the ability to use new applications in conjunction with other applications including those of different vendors.

The present invention also provides a unique TDMA transport scheme which is controlled at the headend. The scheme allows for the removal of data transport intelligence in each gateway by centralizing intelligence in the headend. Thus, little remote processing power is required because the headend provisions all the gateways on a real time basis using its media access controller (MAC). The MAC dynamically provisions the system for polled, asynchronous and reserved messages. This facilitates near real time response for unsolicited asynchronous messages and guarantees that polled messages will be communicated at least once during a preset period. Also, the TDMA scheme is designed to permit large file transfers.

Centralized intelligence at the headend allows for a low cost side-of-the-home gateway that becomes a translator from the network to the devices located on the subscriber premises. Another advantage realized by the inventive TDMA scheme is the reduced cost for intelligence per gateway. In particular, the cost of the intelligence at the headend can be shared by the subscribers.

BRIEF DESCRIPTION OF THE DRAWINGS

The present invention will now be described in more detail with reference to preferred embodiments of the invention, given only by way of example, and illustrated in the accompanying drawings in which:

FIG. 2 is an exemplary embodiment of a gateway according to the present invention.

FIG. 3 shows an illustrative downstream data packet according to the present invention.

FIG. 4 shows an illustrative upstream data packet according to the present invention.

FIG. 5 provides an illustration of an exemplary TDMA scheme according to the present invention.

DETAILED DESCRIPTION

Figure 1:
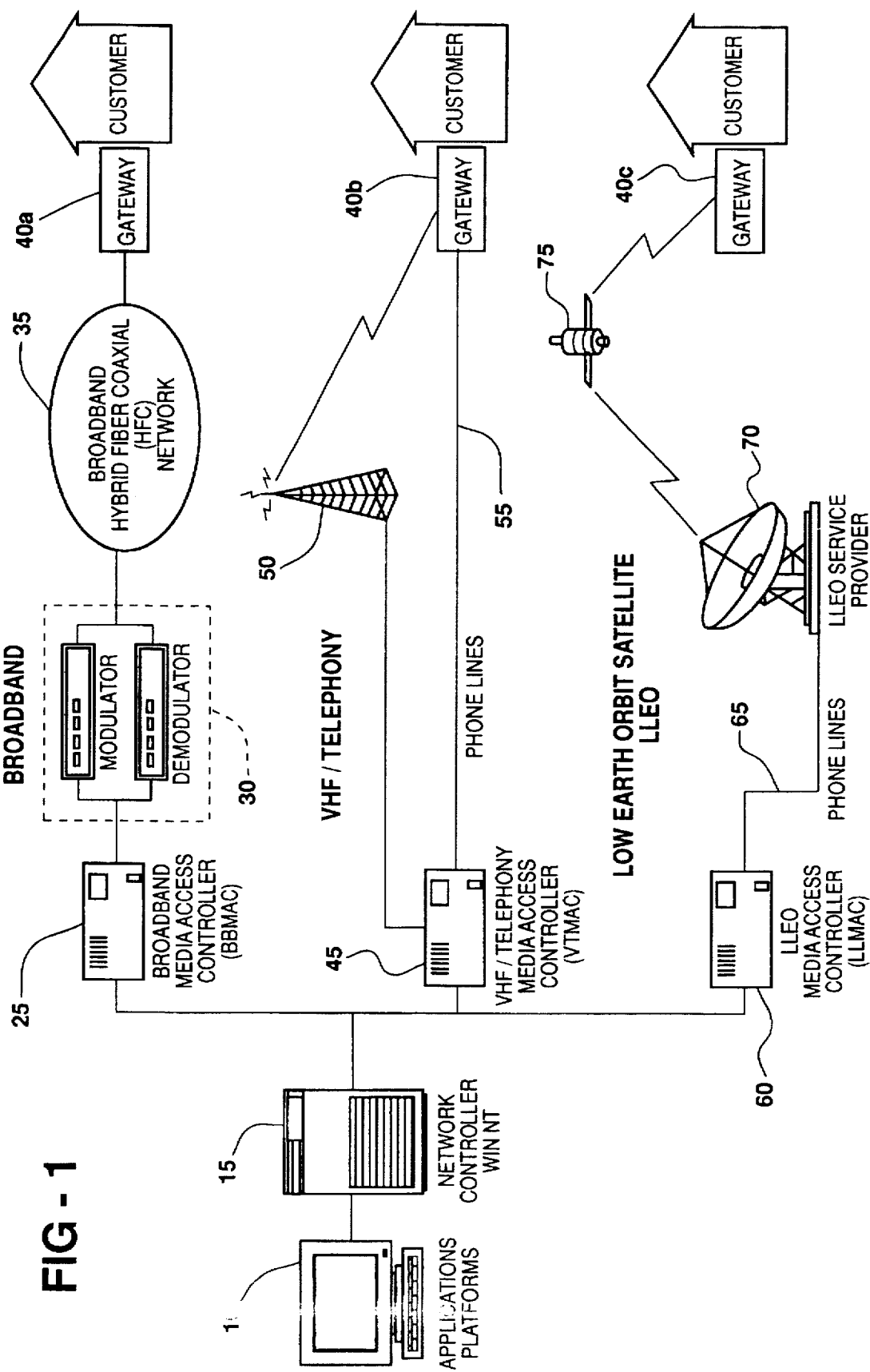
FIG. 1 illustrates several representative wide area networks for transporting information between a headend and subscribers according to the present invention.

The present invention is discussed below with reference to a broadband communications network. However, the present invention may be extended to other types of communications networks and systems. Also, the present invention will primarily be described with reference to residential applications for purposes of illustration, although it should be understood that its applicability is widespread including commercial and industrial applications.

The present invention relates to a system architecture for providing a platform for communicating energy services (utility applications) and non-traditional services as part of an overall communications infrastructure. According to the invention, a native message, regardless of the source of the message's application, is divided into data packets that are encapsulated. The encapsulated data packets are transmitted through an open network from a headend to a gateway or from the gateway to the headend. The receiver of the encapsulated data reassembles the original native message from the encapsulated data packets.

An illustrative embodiment of the system is shown in FIG. 1. Applications platforms 10 provide utility applications to network controller 15 in the form of a native message payload and protocol. An applications platform includes its application and a protocol translator for utilization of the application. The native message payload generated by an applications platform is data for communication between one of the applications platforms 10 and the destination device, for example an in-home device such as a meter or appliance. Other data generated by the applications platforms include a peripheral id (PID) which uniquely identifies the protocol and medium (local area network) for the in-home device, gateway peripheral processor data (GPPD) for communications with the medium for the in-home device, payload message length (len) which identifies the number of bytes in the native message payload, protocol translator id (PTID) which identifies the address of the originating applications platform at the headend, and a communications session identifier (SessionsID) for correlating an upstream response with a particular downstream request.

The system includes multiple applications platforms based on the number of applications. Typical applications include, but are not limited to, automatic meter reading for gas, water, and electric, load management, real time pricing for gas, water, and electric, outage detection, tamper detection (e.g., tampering with meters), remote service connect or disconnect, home security, customer messaging, and home automation. Utility application providers include, among others, Honeywell, General Electric, Schlumberger, American Innovations, and WE X. L.

The network controller 15 receives the native message payload and protocol from one of the applications platforms 10 in a data packet. Communications with the network controller 15 may be by TCP/IP (transaction communication protocol/Internet protocol) on Ethernet or other typical local area network forms. The hardware interface can vary as necessary. A routing look-up table assigns an address to each data packet. The network controller 15 forwards each data packet to an appropriate media access controller (MAC) based on the WAN form used to communicate with the gateway coupled to the subscribers. Thus, prior to sending the data packet to the MAC, the network controller 15 places the native message and protocol in a data packet with the MAC address.

The network controller 15 is a resident database that contains the control algorithms to route and store data for the applications. The network controller 15 configures the downstream flow of data in the system. In functioning as a database, the network controller 15 contains subscriber records and data in its files and provides other applications with data on request. In an exemplary embodiment of the present invention, the network controller 15 can accommodate 65,000 sites in broadband.

The system supports multiple WAN forms including, but not limited to, coaxial, fiber and hybrid fiber coaxial (HFC) broadband, RF, telephony, and satellite (e.g., low-earth orbit (LEO), little LEO (LLEO)). Exemplary WANs are shown in FIG. 1.

When the data packet is to be sent by broadband, the broadband media access controller (BBMAC) 25 receives the data packet and removes the MAC address and encapsulates the data packet with header information and CRC error detection bits. The BBMAC 25 places the data packet into a network TDMA scheme using time slots for communication. The WAN architecture may be designed to support asynchronous transfer mode (ATM) transport with UDP/IP (user datagram protocol/Internet type addressing on the cable system. TDMA addressing is preferred. The TDMA transport is used primarily, on a dynamically allocated basis, for routing message traffic and for file transport facilities. The BBMAC 25 operates in real time using an intelligent device such as a personal computer to transmit and receive real time data to and from a baseband modulator and demodulator in a modem 30. In an exemplary implementation, BBMAC 25 is a Windows NT Pentium running at 166 MHZ with 120M RAM.

The BBMAC 25 passes the slotted data packet in standard NRZ (UART) form at a rate of 115.5 kbps to digital modem 30. The modem 30 includes a broadband modulator and demodulator that physically interface the headend to the HFC network 35. The modem generates data communications (e.g., FSK, QPSK) based on signals provided at baseband in real time. The modulator portion of modem 30 receives the slotted data packet over a hardwired link such as an RS-422 connector. The data packet transmission rate is converted to 125 kbps by a microprocessor such as an 80C51XA by Philips Electronics. The 125 kbps data packet undergoes modulation (e.g., FSK) and is transmitted over the broadband HFC network 35 to gateway 40a.

The HFC network 35 is utility non-application specific, meaning no special modifications are required to provide utility applications. This is a feature common to all the WANs utilized. The typical architecture of an HFC network 35 includes a number of fiber nodes that receive and convert optical signals to electrical signals, and drive two-way signals onto the coaxial plant. In an illustrative embodiment, a fiber node can serve between 500 and 2000 homes. From the node, a coaxial distribution network carries signals to subscribers' homes. Along the distribution network, the side-of-the-home gateways 40a are connected for the final link to the utility application in-home devices such as an electric meter and home user interface. According to this exemplary embodiment, data may be transported at 125 kbps using FSK modulation. This approach permits apparent asynchronous communication, file transfer activities, Internet access and other modem functions, and shareable channel with other services in TDMA. In another broadband embodiment, data may be transported at T1 speed with a 1 MHZ bandwidth in the forward and reverse directions (1.5 Mbps). QPSK modulation may be used for robust data communications and high bandwidth efficiency.

Other WANs can be used and their operation is described herein generally. When the data packet is sent by radio frequency (RF) such as at very high frequency (VHF) or via telephony, a VHF/telephony media access controller (VTMAC) 45 receives and transmits the data packet.

Thereafter, if the data packet contains an unscheduled message, it is distributed by RF and sent to a radio tower 50 which broadcasts the information over the RF network to gateway 40b. Otherwise, the data packet is put onto the telephone network phone lines 55 and sent to gateway 40b. According to this exemplary configuration, the VTMAC 45 can control data transport so that unscheduled messages can be transported via the RF network while scheduled transactions and gateway return communications can be transported via the telephone network.

If the data packet is to be distributed via satellite, a little LEO (LLEO) media access controller (LLMAC) 60 receives and communicates the data packet over the phone lines 65 to a LLEO service provider 70 that broadcasts the information over a satellite network 75 to a gateway 40c.

An illustrative gateway 40 is depicted in FIG. 2. The gateway 40 provides data communications from the WAN to a home LAN, and is designed to facilitate communication between the utility host (applications platforms) and residential devices such as an electric meter or home user interface. The gateway 40 can designed to handle communications for a single homesite or multiple homesites and support installations at the homesite as well as pole top and other locations.

Encapsulated data packets are received over the WAN from the headend. The gateway 40 has one WAN interface 405 corresponding to the WAN (e.g., broadband, LLEO, RF, etc.) from which it communicates with the headend. The WAN interfaces are plug-in modules removable from the gateway. Thus, another complete physical and logical WAN interface can be implemented without the need to change any other parameters or devices in the gateway 40. Thus, if data transport is to take place over a different WAN network, the WAN interface 405 can simply be replaced.

In an exemplary broadband implementation of the gateway 40, the WAN interface 405 may include an FSK transceiver if the modulation technique at the headend is FSK. Also, the WAN interface 405 provides control for the TDMA transport scheme using a microprocessor. The microprocessor can receive messages, check CRC and address information, perform TDMA decoding, clocking, bus interface and memory management. The microprocessor will also manage the TDMA transmitter in response to the embedded clock signals in the downstream data packets. The microprocessor may be an 80C51XA made by Philips Electronics or in the Motorola 68000 family with internal ROM, RAM and EEROM.

According to another exemplary broadband implementation of the gateway 40, the WAN interface 405 may include a QPSK transceiver if the headend uses QPSK modulation. Some of the functions which may be embedded in this illustrative WAN interface include ATM filtering, IP filtering, TDMA control, CRC calculator, 68000 type or 80C51XA microcontroller, and bus controller and LAN interface drivers. External ROM may be used to support program control of the WAN communications interface. An external RAM can provide temporary storage of data. An external EEROM may be provided for permanent storage for MAC address and other permanent or semi-permanent data. The microcontroller manages slotted Aloha transmission and the TDMA transport scheme.

The WAN interface 405 demodulates the data packet and removes the header including routing and control information from the packet put on by the MAC. The WAN interface 405 sends the data over common bus 410 to an appropriate LAN interface 415, 420, 425 which translates and removes the protocol and recovers the native message when the gateway 40 is instructed to listen and pass the native message to the in-home device 430. The protocol removed includes PTID, PID, GPPD, and SessionID.

In the illustrative embodiment of FIG. 2, three LAN interfaces 415, 420 and 425 are provided. It is to be understood that any number of LAN interfaces may be provided. However, it is prudent to choose a relatively small number such as five because the size of the gateway increases as the number of LAN interfaces increases. Also, when a new application is implemented by a subscriber, the LAN interface corresponding to the new application simply needs to be added. The LAN interfaces can be plug-in cards, wherein replacement and addition of LAN interfaces is relatively easy. Exemplary LAN interfaces may include a LonWorks™ interface, CEBus™ interface, hardwired interface, RF interface, an RS-232 interface, and a broadband modem. LonWorks™ and CEBUS™ are specific protocol designed for power line carrier communications.

The LonWorks™ interface is designed to provided Echelon power line carrier communications for the home LAN. The interface includes a microprocessor which is responsible for bus interface and protocol translations. The microprocessor may be a Neuron chip by Motorola. The Neuron chip receives standard LonWorks™ protocol to be inserted on the power lines. The data is routed to an Echelon PLT 20 communications device and inserted on the power wiring through a coupling network and external wiring. The Neuron chip handles data transport issues including collisions and delivers the requested data to the microprocessor when available. The microprocessor then presents data to the WAN interface 405 via the common bus 410 for communications to the MAC or other application as directed by routing (mapping) tables in the WAN interface 405. In some instances, gateway 40 may have intelligence such as in a narrowband implementation or in broadband if intelligent gateway and be able to directly rout information elsewhere, for example to a nearby load control device.

The CEBus™ interface provides CEBus™ power line carrier communications for the home LAN. The microprocessor may be in the 68000 family or a Philips 80C51XA and interface with a CEBus™ communications device which inserts the data on the power wiring through a coupling network and external wiring. The microprocessor handles data transport issues including collisions and delivers the requested data to the WAN interface 405 via the common bus 410 for communications to the MAC or other application as directed by routing (mapping) tables in the WAN interface 405.

The hardwired interface is provided for applications such as low cost scenarios. This interface provides for a pulse initiator and maintains an accumulator function with an EEROM type memory and long term battery support. The interface takes input from devices such as electric, gas, and water meters.

The RF interface provides wireless communications for devices in and around the home such as electric, gas, and water meters, and appliances.

An RS-232 interface can support services such as local narrowband nodes. The RS-232 interface may extract data files from a local host system on command. This permits the transfer of large data files.

A broadband modem may share the utility data communications channel for the purpose of Internet access and other computer type services. Rapid access to file servers providing access to a variety of services can be realized.

A native message is transmitted upstream from the in-home device 430 to the applications platforms 10 over the same media. The in-home device 430 passes the native message to its corresponding LAN interface (one of 415, 420, 425). The LAN interface adds the protocol to the native message and passes the data packet with the protocol and native message to the WAN interface 405 via the bus 410. The WAN interface 405 encapsulates the data packet by adding a header and transmits the information upstream from the gateway 40 over the appropriate WAN to the headend. For example, the gateway 40 can transmit the information over the HFC network 35 to the headend at a rate to 125 kbps. At the headend, the demodulator portion of broadband modem 30 demodulates the upstream data packet from a 125 kbps FSK modulated NRZ signal to a 115.2 kbps baseband NRZ signal.

The encapsulated data packet is then sent to the BBMAC 25 over an RS-422 data link. BBMAC 25 removes the header information leaving the protocol and native message. BBMAC 25 acknowledges receipt of upstream asynchronous messages prior to hand off to other applications to preserve data integrity. In the TDMA mode, BBMAC 25 checks for transport cell integrity by performing cyclic redundancy checking on the data and forwarding the data to the appropriate one of the applications platforms 10. To further enhance data integrity, BBMAC 25 sets up sessions between the applications platforms 10 and gateway 40. BBMAC 25 behaves as a bridging data router between the application platforms 10 and the in-home devices coupled to the gateway 40. Communications to applications platforms 10 can be tightly linked to minimize real time delay for message transport while not slowing polled and asynchronous data transport. Returned power levels can be evaluated on every returned message and can be adjusted when outside predetermined boundaries.

The data packet passes through the network controller 15 and to the appropriate applications platform 10 where the protocol is removed and the native message from the in-home device 430 is recovered.

An illustrative TDMA transport scheme according to the present invention for use in a broadband network is controlled by BBMAC 25. The header information encapsulating the native message and protocol provides for the scheme. FIG. 3 shows the contents of an exemplary downstream data packet. Bytes 1–21 represent the header information added by BBMAC 25 to the protocol (bytes 22–30) and the native message (bytes 31–94) with bytes 95 and 95 providing the CRC error detection. FIG. 4 shows the contents of an illustrative upstream data packet. Bytes 1–13 represent the header information added by the LAN interface to the protocol (bytes 14–22) and the native message (bytes 23–86) with bytes 87 and 88 providing CRC error detection.

The TDMA scheme can best be explained by reference to the "wheels" shown in FIG. 5. The command wheel represents a system with six gateways. The TDMA scheme incorporates polled (1P, 2P, 3P, 4P, 5P, 6P), asynchronous (1A, 2A, 3A, 4A, 5A, 6A), and reserved (1R, 2R, 3R, 4R, 5R, 6R) slots. A predetermined time interval is divided into a predetermined number of slots. In an illustrative embodiment, the interval is one minute divided into 6000 time slots. One third of the slots are dedicated to polling the gateways on the network. A second third of the slots are dedicated to asynchronous messages including unsolicited messages such as fire alarms, security alarms, and upstream customer messages. The final third of the slots are reserved and are dynamically allocated by BBMAC 25. The reserved slots can be assigned as polled slots for activities such as file transfers or as asynchronous slots for networks with a high volume of unsolicited data or when not needed as polled slots.

FIG. 5 provides an example of a system with eighteen slots and six gateways for explanation. In each downstream transmission, BBMAC 25 communicates with at least one gateway by embedding listen (listenAddr), talk (talkAddr), and acknowledge (ackAdr) addresses into each downstream packet.

A factory assigned gateway address (talkAddrFactory) identifies a gateway by its factory serial number to assign its operational address and is transmitted to a particular gateway when BBMAC 25 wants to assign an operational address to the gateway. Although this field is included in each downstream transmission, it is often null because the gateway presumably has already been assigned its operational address. The gateway whose factory address matches this field writes the contents of the field into its EEPROM as a new operational address and proceeds as if it received a talkAddr address match. In upstream communications, the talkAddrFactory is always transmitted and allows BBMAC 25 to verify that the gateway talkAddrFactory and talkAddr match.

The operational talk address (talkAddr) has two uses including assigning the contents of this field as a new operational address when the talkAddrFactory matches and transmitting a response in the next slot, whether or not the talkAddrFactory matches. Referring to the command wheel of FIG. 5, one of the six gateways is polled every three slots. Polling occurs at least during slots 1P, 2P, 3P, 4P, 5P, and 6P. To poll a gateway, BBMAC must request the gateway to talk. Consequently, a talkAddr corresponding to one of the gateways is sent telling the identified gateway to talk during slot 1P shown on the talk wheel in FIG. 5. The talk wheel is offset slightly from the command wheel to show that the talking occurs slightly later in time than the command to talk. When a gateway is polled by receiving its corresponding talkAddr, it must transmit a response. The gateway transmits a null response when it does not have an upstream message. After the passage of two more slots, a second gateway is polled during slot 2P of the command wheel and provides a return message during slot 2P of the command wheel, and so on until all the gateways are polled during their corresponding slot. The polling process repeats itself for each rotation of the wheel.

When both the talkAddrFactory and talkAddr are zero, an aloha upstream slot is available for all gateways to transmit upstream. Referring to the command wheel of FIG. 5, both the talkAddrFactory and talkAddr are zero in an asynchronous slot which occurs at least every third slot (1A, 2A, 3A, 4A, 5A, 6A). When this occurs in slot 2A on the command wheel, any gateway satisfying the criteria for an aloha transmission can make an asynchronous transmission during slot 2A shown on the talk wheel. Three slots later, in slot 3A of the command wheel, the gateway again informs all qualified gateways that they can make an asynchronous transmission in slot 3A of the talk wheel. This process continues every three slots during the rotation of the wheel.

In upstream communications, the gateway provides the talkAddr to BBMAC for address verification purposes. That is, the talkAddr tells the BBMAC what gateway has sent the upstream message.

The BBMAC places the destination address for the protocol and native message payload in a listen address (listAddr). Thus, the gateway address for the message is found in the listAddr. The WAN interface at each gateway evaluates the listAddr to determine whether to further process the data packet.

One of the parameters that impacts whether a gateway can make an asynchronous transmission is the aloha transmission delay parameter (holdOff). The holdOff parameter defines a fixed delay period before a gateway may commence its random timing for an aloha transmission. When the WAN interface detects that the listAddr of a message matches the assigned gateway address, a delay in upstream transmission occurs. When the gateway has data to transmit upstream, it must wait a predetermined amount of time before commencing upstream transmission. For example, the gateway may count five talk slots for each count in the message before beginning a random down count. This example represents a delay of about 50 ms for each count, or a range of 0–12.7 seconds. If the holdOff byte contains all ones, the gateway may be disabled from asynchronous transmission altogether and limited to transmitting in its regularly polled slot.

Downstream command/data (GatewayControl) is transmitted from the BBMAC to the gateway. In this signal, the BBMAC informs the gateway when the system at the headend above the BBMAC (network controller, applications platforms) has failed in that the BBMAC cannot communicate with these elements. The BBMAC continues to operate and scan the gateways, but the gateways need to adjust to save critical information.

Also, the gateway control has an aloha range used by the BBMAC to adjust the backoff timing of colliding data messages. The aloha range is used in addition to the holdOff parameter to delay aloha retry. The aloha range indicates the number of bits in a random number that the gateway uses to count the number of transmissions slots before an aloha retry. For example, if the number 7 (0111) is transmitted in this slot, the gateway whose assigned address matches the transmitted listAddr stores the value 7 in RAM. The next time the gateway has a message to transmit upstream, it calculates a 7-bit random number, and decrements this number whenever it detects a transmitted aloha slot (talkAddr=0). When this number is fully decremented and the holdOff parameter, if any, has expired, the gateway transmits during the next aloha slot.

The BBMAC transmits an acknowledge address (ackAdr), which matches the assigned gateway address of the transmitting gateway, to acknowledge receipt of a message from the transmitting gateway. The BBMAC also loads the acknowledgment field (ackNum) with the sequence number (seqNum) from the message being acknowledged. When an aloha slot is available, multiple gateways may attempt to transmit messages simultaneously resulting in collisions. When a gateway successfully transmits a message to the headend, the ackAdr after a certain peeway. Thus, after a certain period has expired, if no ackAdr has been received by the gateway, the gateway message transmission resulted in a collision or was otherwise unsuccessful. The gateway can then attempt to transmit the data again.

The sequence number (seqNum) is used in conjunction with ackNum to correlate each acknowledge response to the message being acknowledged. For downstream transmissions, the BBMAC maintains a sequence number for each gateway in the system. When the BBMAC sends a message to a particular gateway (listAddr=assigned gateway address), the value of the sequence number is included in the seqNum field. The BBMAC increments the seqNum anticipating the next transmission. The gateway maintains a seqNum receive register for storing the received seqNum value. For every transmission received by the gateway in which listAddr=assigned gateway address, the value in the seqNum field is written into the seqNum receive register. When the BBMAC polls the gateway, the gateway returns the contents of the seqNum receive register in the ackNum field of the upstream transmission.

For upstream transmissions, the gateway maintains one seqNum since it talks to one BBMAC. When the gateway sends a message upstream, either in its polled slot or an aloha slot, the gateway transmits the seqNum value to the BBMAC and increments seqNum. When the BBMAC sends an acknowledgment to the gateway (ackAddr=assigned gateway address), the last received seqNum from that particular gateway is transmitted in the ackNum slot. The gateway checks to see whether ackNum=seqNum+1 to determine whether the transaction was successful.

The BBMAC generates a serial number in the form of frame number (frameNum) for each downstream transmission. When the BBMAC sends a valid talk address to a gateway, the gateway immediately responds and as part of its upstream message, the gateway echoes the transmitted frameNum. In this way, the BBMAC may correlate its received messages to real time, and account for receiver FIFO delays.

A message type (msgType) in the upstream and downstream data packets identifies the nature of the transmitted message. Some of the available message types include, no message present, unnumbered message—ignore the seqNum field, and numbered message—use seqNum field when responding to this message.

There will be instances when a particular gateway needs to transfer large files to the headend. However, it is not desirable to clog that gateway's regularly polled slot (e.g., 4P) with large data transfers because it is inefficient. The headend often knows that a particular gateway is going to transmit a large message because it has requested the information. Thus, the headend can dynamically allocate the necessary upstream reserved slots to the particular gateway for such a transmission. Also, when a gateway transmits a data packet upstream in an aloha (asynchronous) slot or its assigned polling slot, the gateway can set a flag to indicate that the message from the particular gateway is not complete, i.e., that there is more data to be transmitted. In this instance, the BBMAC can also dynamically assign the reserved slots to that gateway.

To dynamically allocate one or more reserved slots (1R, 2R, 3R, 4R, etc.) to the gateway needing to make a large data transfer, the BBMAC transmits a talkAddr and polls the gateway wanting to make the data transfer during reserved slots until the transfer is complete. Dynamic allocation is based on the system requirements including traffic and the BBMAC can allocate the reserved slots in any manner, such as successively, periodically and randomly.

For example, if the BBMAC learns that gateway 2 has a large data file (10 additional slots worth of information) to transfer and the command wheel is at slot 3A, the BBMAC can allocate an upcoming reserved slot, such as slot 3R to gateway 2. Thus, during slot 3R of the command wheel, the BBMAC can poll gateway 2. Gateway 2 then transfers data during slot 3R on the talk wheel. The BBMAC can allocate the remaining portion of the transmission in any desired manner such as successively, during slots 4R, 5R, 6R, 1R, 2P (gateway 2's regular polling slot), 2R, 3R, 4R, and 5R of the command wheel. Thus, gateway 2 is polled during these allocated slots and transfers data during slots 4R, 5R, 6R, 1R, 2P, 2R, 3R, 4R, and 5R of the talk wheel.

Each gateway can have the ability to prioritize its own messages. Thus, if a gateway is in the midst of transmitting a large file and it has a higher priority message such as an emergency message, the gateway can transmit the higher priority message in the next slot in which is polled, or in an aloha slot. Thus, the gateway can interrupt transmission of a data message to transmit a higher priority message at the expense of delaying the data message.

If multiple gateways want to transfer large files at the same time, the BBMAC prioritizes the allocation of time slots. Priority can be determined by a priority message transmitted by the gateway or by predetermined data stored in the BBMAC. The BBMAC can interleave the data transfer from different gateways by assigning the reserved slots in a periodic or random manner to the different gateways. For example, if gateways 1, 3, and 4 have large file transfers, upstream reserved slot 1R can be assigned to gateway 3, upstream reserved slot 2R can be assigned to gateway 3, upstream reserved slot 3R can be assigned to slot gateway 1, upstream reserved slot 4R can be assigned to gateway 5, upstream reserved slot 5R can be assigned as an aloha slot, upstream reserved slot 6R can be assigned to gateway 3, and so on. The reserved slots can also be allocated to aloha transmission in the same manner as the dedicated asynchronous slots (1A, 2A, etc.).

It should also be understood that since the headend allocates the time slots, it can dynamically allocate all upstream time slots. However, the preferred configuration of the transport data scheme polls each gateway periodically to ensure that a message from that gateway can be transmitted upstream.

One of the advantages of the TDMA transport scheme is if a gateway cannot successfully transmit a message during an asynchronous slot, the gateway will be able to transmit the message when the talk wheel returns to the gateways' polling slot. Thus, the gateway is guaranteed to talk within a given period of time which is no longer than a single trip around the wheel. Thus, there is an assurance that any message can promptly be broadcast to the headend. Another benefit derived by the transport scheme is the gateway can communicate with more than one gateway at a time during a single downstream transmission. For example, the BBMAC can transmit the data payload to one gateway (listAddr), acknowledge receipt of a message from a second gateway (ackAdr), and poll a third gateway (talkAddr).

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A time division multiple access scheme for transporting data over a network between a headend and a plurality of gateways comprising the steps of:

transmitting a first polling signal from a headend to a plurality of gateways during a first downstream time slot, the first polling signal polling a first gateway;

transmitting a first message from the first gateway to the headend in response to the first polling signal during a first upstream time slot;

transmitting a first asynchronous transfer signal from the headend to the plurality of gateways during a second downstream time slot, the first asynchronous transfer signal indicating availability for transmission by any available gateway of the plurality of gateways during a second upstream time slot;

dynamically allocating a third upstream time slot for at least one of an asynchronous transmission or a polled communication;

transmitting a second polling signal if the third upstream time slot has been allocated to the polled communication from the headend to the plurality of gateways during a third downstream time slot, wherein the second polling signal polls a second gateway, and in response to the second polling signal the second gateway transmits a second message during the third upstream time slot; and transmitting a second asynchronous transfer signal if the third upstream time slot has been allocated to the asynchronous transmission from the headend to the plurality of gateways during the third downstream time slot, wherein the second asynchronous transfer signal indicates availability for transmission by any available gateway of the plurality of gateways during the third upstream time slot.

2. The method according to claim 1, wherein said step of transmitting the first polling signal is repeated so that the first polling polls each of the plurality of gateways during a predetermined period.

3. The method according to claim 1, wherein the first polling signal is transmitted during a third of the downstream time slots, the first asynchronous transfer signal is transmitted during a second third of the downstream time slots, and one of the second polling signal and the second asynchronous transfer signal is transmitted during another third of the downstream time slots.

4. The method according to claim 1, wherein the first polling signal includes a first address signal identifying the first gateway and the second polling signal includes a second address identifying the second gateway, wherein the first polling signal and the second polling signal identify the same or different gateways.

5. The method according to claim 1, wherein the first polling signal, the first asynchronous transfer signal, and the second polling signal or the second asynchronous transfer signal correspond to a talk address which identifies the gateways authorized to transmit during the first upstream time slot, the second upstream time slot, and third upstream time slot, respectively.

6. The method according to claim 5, wherein the talk address is transmitted in a downstream data packet including a listen address, an acknowledge address, and a data payload, wherein the listen address identifies a third gateway for receiving the data payload, and the acknowledge address identifies a fourth gateway and acknowledges receipt of a message transmitted by the fourth gateway.

* * * * *